United States Patent [19]

Miyoshi et al.

[11] Patent Number: 4,508,761

[45] Date of Patent: Apr. 2, 1985

[54] METHOD OF PREPARING POLYMER-COATED PARTICULATE INORGANIC MATERIAL

[75] Inventors: Takao Miyoshi; Akira Sakanoue, both of Ube, Japan

[73] Assignee: Central Glass Company Limited, Ube, Japan

[21] Appl. No.: 467,839

[22] Filed: Feb. 18, 1983

[30] Foreign Application Priority Data

Feb. 19, 1982 [JP] Japan .................. 57-24292

[51] Int. Cl.³ .................. B05D 7/00; B29J 5/00
[52] U.S. Cl. .................. 427/221; 264/109; 524/701; 524/780; 524/789; 524/791; 524/847
[58] Field of Search .................. 264/109; 427/221; 524/701, 780, 789, 791, 847

[56] References Cited

U.S. PATENT DOCUMENTS

| 3,560,254 | 2/1971 | Seddon .................. 427/221 X |
| 3,904,568 | 9/1975 | Yamaguchi et al. .................. 524/789 X |
| 3,953,657 | 4/1976 | Yamaguchi et al. .................. 264/109 X |
| 4,129,549 | 12/1978 | Kahane .................. 524/789 X |

FOREIGN PATENT DOCUMENTS 1038530 9/1978 Canada .

56-112995 7/1981 Japan .

*Primary Examiner*—Michael R. Lusignan
*Attorney, Agent, or Firm*—Fleit, Jacobson, Cohn & Price

[57] ABSTRACT

A polymer-coated particulate inorganic material, e.g. graphite, graphite fluoride or molybdenum disulfide, is obtained by preparing a reaction system containing a liquid medium, fine particles of the inorganic material, at least one vinylic monomer which undergoes radical polymerization or copolymerization and a polymerization initiator and allowing the vinylic monomer(s) in the reaction system to undergo polymerization and to bond to the surfaces of the inorganic material particles by graft polymerization. To enhance the efficiency of graft polymerization to thereby realize uniform coating even when the inorganic material is very low in surface energy as typified by graphite fluoride, the pH of the reaction system is adjusted to a value ranging from 5 to 9 by adding alkali to the reaction system soon after the addition of the polymerization initiator or alternatively by treating the inorganic material with alkali in advance of preparation of the reaction system. The polymer-coated inorganic material can easily be shaped into a solid body by compacting, optionally with addition of a synthetic resin.

22 Claims, 5 Drawing Figures

1μm

|—————|
1μm

|—————|
1μm

|—————|
1μm

METHOD OF PREPARING POLYMER-COATED PARTICULATE INORGANIC MATERIAL

BACKGROUND OF THE INVENTION

This invention relates to a method of preparing a polymer-coated particulate inorganic material. Graphite fluoride is a typical example of inorganic materials to which the invention is applicable. A polymer-coated inorganic material obtained by the method of the invention is of use either in powder form, as solid lubricant for example, or in compacted form optionally with addition of a synthetic resin as bearings or sealing elements for example.

Powders of various inorganic materials are of wide application and have been used, for example, as solid lubricants, as materials for press-formed articles and fillers for plastics and rubbers. In some cases there arises the need of subjecting the particles of the inorganic material to certain treatment or using a certain auxiliary material in order to obviate some disadvantages or inconveniences attributed to physical and chemical properties of the particles surfaces. For example, fine particles of an inorganic material used as solid lubricant are often dispersed in lubricating oil or grease, but usually it is difficult to realize uniform dispersion because of low affinity of the inorganic material for the dispersing medium and a great difference in specific gravity between the inorganic material and the dispersing medium and therefore, it is usual to add a relatively large amount of dispersing agent. Although the dispersion is improved, the presence of a large amount of dispersing agent becomes an obstacle to efficient action of the dispersed solid lubricant, and therefore often it becomes necessary to use an increased quantity of solid lubricant in order to achieve a desired purpose.

Typical examples of inorganic materials useful as solid lubricants are graphite, graphite fluoride, molybdenum disulfide, tungsten disulfide, boron nitride, talc and mica. Among these materials graphite fluoride has been attracting increasing interest mainly by reason of its remarkably high lubricating ability, but it is very difficult to well disperse pure graphite fluoride particles in water or organic medium.

Graphite fluoride is a solid material in the form of white or grayish powder obtained by reaction between graphite or carbon in different form and fluorine. As typical examples of graphite fluoride, $(CF)_n$ and $(C_2F)_n$ are known as stable and industrially useful polymeric compounds. Generally graphite fluoride exhibits remarkably high lubricating and water- and oil-repelling properties and is excellent in resistance to various chemicals. Accordingly graphite fluoride has been used as solid lubricant in many fields and, besides, serves for releasing, water- or oil-repelling and anti-contaminating purposes. Also it is known to produce a solid body of a specific use, such as an electrolytic cell electrode, by press-shaping of a composition containing graphite fluoride as a main ingredient.

In practical applications, however, very strong water- and oil-repelling property of graphite fluoride, which is attributed to extraordinarily low surface energy of this material, offers inconvenience or difficulty in various respects. That is, this material can hardly be dispersed in water and is very low in miscibility with organic materials and poor in formability.

Regarding the use of graphite fluoride as solid lubricant, it is ideal that fine particles of pure graphite fluoride provide a continuous and closely contacting film on the applied surface, and for this reason often it is wished to disperse graphite fluoride in water without using any auxiliary material. Actually, however, graphite fluoride is practically devoid of wettability with water as demonstrated by the fact that the contact angle of $(CF)_n$ for water is 145°, which is a very large value compared with the 100°–110° contact angle of polytetrafluoroethylene (PTFE) useful as solid lubricant, and therefore it is practically impossible to disperse pure graphite fluoride in water.

In view of this problem, it has been proposed to use a dispersing agent such as colloidal silica jointly with graphite fluoride. Although the use of such a dispersing agent is effective for preparation of an aqueous dispersion, there arises another problem that the content of graphite fluoride in the dispersed solid phase cannot be made so large as desired: the graphite fluoride content must be limited to about 60% by weight at the maximum. Therefore, it becomes impossible to fully utilize the favorable properties of graphite fluoride originated in the low surface energy of this material. Also it has been proposed to coat the particles of graphite fluoride with a binding material such as wax or a mixture of a binding material and a surface-active agent. In practice, however, it is very difficult to achieve uniform coating of the graphite fluoride particles by using a desirably small amount of such a coating material so as to allow the coated graphite fluoride to sufficiently exhibit its characteristic properties. Furthermore, the coating is not always stable under various conditions in the uses of the coated graphite fluoride because the coating is established merely by adsorption and adhesion, i.e. physical bonding, of the binding material onto the surfaces of the graphite fluoride particles.

In the case of producing an electrode of a primary cell by using graphite fluoride as a typical example of compacting of compositions containing graphite fluoride as the principal ingredient, it is known to press-shape a mixture of graphite fluoride and PTFE. The mixture is usually prepared by using an aqueous dispersion of PTFE obtained by emulsion polymerization of tetrafluoroethylene. Since graphite fluoride is strongly water-repelling, there is the need of suspending graphite fluoride particles in an organic solvent having strong affinity for water in advance of the addition of graphite fluoride to the aqueous dispersion of PTFE, and it is necessary to use a considerably large amount of organic solvent in order to fully wet the graphite fluoride particles. However, the use of such a large quantity of organic solvent causes coagulation of PTFE particles during mixing of the graphite fluoride suspended in the solvent with the aqueous dispersion of PTFE, so that the mixing results in formation of undesirably large aggromelates and fails to give a uniformly mixed powdery mixture. Furthermore, the large aggromelates are very tacky and, hence, are difficult to thoroughly pulverize. If the mixture containing the large aggromelates left uncrushed is subjected to press-shaping, it is very difficult to obtain a shaped body of good quality because the existence of the aggromelates becomes a significant obstacle to uniform transmission of the applied pressure and therefore is liable to produce strains in the press-shaped body.

Japanese patent application primary publication No. 56(1981)-112995 proposes to prepare a lubricant composition by first coating the particles of an inorganic material useful as solid lubricant with a vinylic polymer, which is formed by carrying out graft polymerization of a vinylic monomer on the surfaces of the particles, and then dispersing the polymer-coated solid inorganic material in a suitable medium. In this method, however, the efficiency of graft polymerization represented by the proportion of the polymer bonded to the inorganic material particles to the monomer subjected to the polymerization reaction hardly becomes above about 70% so that this method cannot be regarded as an efficient coating method. Furthermore, polymer-coated powders prepared by this method are not yet satisfactory in the capability of dispersing in various media or affinity for liquid materials used as dispersing media. When the powdery inorganic material to be coated by this method is low in its surface energy as in the case of graphite fluoride, it is almost impossible to realize a sufficient coating of the powder with the grafted polymer, and therefore the polymer-coated graphite fluoride still retains inconvenient properties of graphite fluoride such as low affinity for water and various organic materials and poor tendency to dispersion in various liquids.

SUMMARY OF THE INVENTION

It is an object of the present invention to provide an improved method of preparing a polymer-coated particulate inorganic material, preferably one useful as solid lubricant, by carrying out graft polymerization of a vinylic monomer on the surfaces of the inorganic material particles, which method is sufficiently high in the efficiency of graft polymerization so that the coated inorganic material is greatly improved in the capability of dispersing in both water and organic liquids, in miscibility with organic materials and also in formability even when the particulate inorganic material is very low in surface energy as typified by graphite fluoride.

According to the invention, a polymer-coated particulate inorganic material is prepared by a method comprising the steps of preparing a reaction system comprising a liquid medium, an inorganic material in the form of fine particles, at least one vinylic monomer capable of undergoing radical polymerization or radical copolymerization and a polymerization initiator for the vinylic monomer(s), adjusting the pH of the reaction system to a value in the range from 5 to 9, and allowing the vinylic monomer(s) to undergo polymerization or copolymerization and to bond to the surfaces of the inorganic material particles by graft polymerization.

Graphite, graphite fluoride, molybdenum disulfide, tungsten disulfide, boron nitride, talc and mica are examples of inorganic materials suitable for use in the present invention. That is, the method of the invention is particularly suited to the preparation of a polymer-coated inorganic solid lubricant. This method will be of very fruitful use in the preparation of polymer-coated graphite fluoride. Graphite fluoride to be coated by this method may be either $(CF)_n$ or $(C_2F)_n$, or any mixture of $(CF)_n$ and $(C_2F)_n$.

In most cases it is suitable to prepare the aforementioned reaction system by dispersing the inorganic material and vinylic monomer(s) in water with the addition of either an organic solvent soluble in water or a surface-active agent and thereafter adding a water-soluble polymerization initiator, but it is also possible to use an organic liquid alone as the liquid medium. It is also possible to employ a semi-dry process in which only an almost negligibly small quantity of water is used. The adjustment of the pH of the reaction system, which is the principal feature of the present invention as will be explained hereinafter, can be accomplished by adding an alkaline compound to the reaction system containing the polymerization initiator or alternatively by treating the inorganic material particles with an alkaline solution or gas prior to the preparation of the aforementioned reaction system. The graft polymerization process according to the invention can be carried out at room temperature, but it is effective for enhancement of the rate of polymerization reaction to heat the reaction system up to about 70° C.

In regard to the method of the aforementioned Japanese Publication No. 56-112995, we have recognized that a primary reason for the low degree of graft polymerization of the vinylic monomer is insufficiency in the total number of active points on the surfaces of the inorganic material particles and that this problem becomes especially serious when the inorganic material is very low in surface energy as typified by graphite fluoride. As a result of extensive studies for a more efficient method of preparing polymer-coated inorganic materials by utilizing graft polymerization of vinylic monomer on the surfaces of the inorganic material particles, we have discovered that the efficiency of the graft polymerization can be surprisingly enhanced by adjusting the pH of the polymerization reaction system to a value in the range from 5 to 9 prior to substantial proceeding of the polymerization reaction. Even when the inorganic material to be coated is graphite fluoride, the grafting efficiency by the method of the invention becomes more than 90% and in some cases nearly 100%.

When graphite fluoride or molybdenum disulfide, for example, is dispersed in water by the aid of an organic solvent or a surface-active agent, the aqueous dispersion or mixture becomes acidic and exhibits a pH value of about 2 to 4. Presumably this is because of the existence of a small quantity of free fluorine or sulfur on the surfaces of the dispersed particles. Besides, polymerization initiators for vinylic monomers useful for the method of the invention (and also for the method of the Japanese Publication No. 56-112995) are mostly acidic substances. Without adjustment of the pH as in the method of the Japanese Publication No. 56-112995, it is natural that the polymerization reaction takes place under an acidic condition represented by a pH value ranging from about 2 to 4.

Presumably the reason for a remarkable enhancement of the efficiency of the graft polymerization by the adjustment of the pH of the reaction system to 5-9 by using an alkali is that the neutralization of the free fluorine or sulfur as the source of acidity, as well as the polymerization initiator, by the attack of the alkali on the surfaces of the inorganic material particles results in the appearance of numerous active points on the particles surfaces. In an experiment on an aqueous dispersion of graphite fluoride $(CF)_n$ having a pH value of about 3, the addition of an alkali to raise the pH of the dispersion to about 8 caused the initially white color of the dispersion to change to a brownish color, so that a neutralization phenomenon on the surfaces of the graphite fluoride particles was understandable.

In the polymer-coated particulate inorganic material obtained by the method according to the invention, the vinylic polymer coating is chemically bonding to the surfaces of the inorganic material particles by graft polymerization. Unlike conventional coatings produced by mere adsorption or physical adhesion, the polymer coating produced by the method of the invention is so high in the bonding strength that the coating cannot easily be removed even by solvent extraction. Therefore, it is possible to realize a uniform and very firm coating on each individual particle of the treated inorganic material without the need of using an undesirably large amount of coating material. It will be permissible to describe the polymer-coated inorganic material obtained by the present invention as "microencapsulated". However, the product of this method is not strictly limited to inorganic material particles each completely coated with vinylic polymer. Even when the polymer coating is incomplete so that the surfaces of the inorganic material particles are partly exposed, the above stated preparation method is within the scope of the present invention.

The polymer-coated inorganic material obtained by the method of the invention is easy to disperse in water or in various organic liquids, even in the case of graphite fluoride, and long remains in well dispersed state. Furthermore, this polymer-coated inorganic material is excellent in formability and is well miscible with various synthetic resins, so that it is easy to produce solid bodies by press-shaping of this material, or a powder mixture of this material and a synthetic resin, with uniform distribution of the particles of the polymer-coated material in every shaped body.

A polymer-coated solid lubricant such as polymer-coated graphite fluoride prepared by the method of the invention retains and fully exhibits its favorable characteristics including high lubricating ability. Accordingly this polymer-coated solid lubricant has very wide uses in various fields. For example, this polymer-coated solid lubricant is very suitable for addition to lubricating oils and greases and various rubbers and plastics, and also is suitable for press-shaping into self-lubricating bearing packings.

DESCRIPTION OF THE PREFERRED EMBODIMENTS

Figure 1:
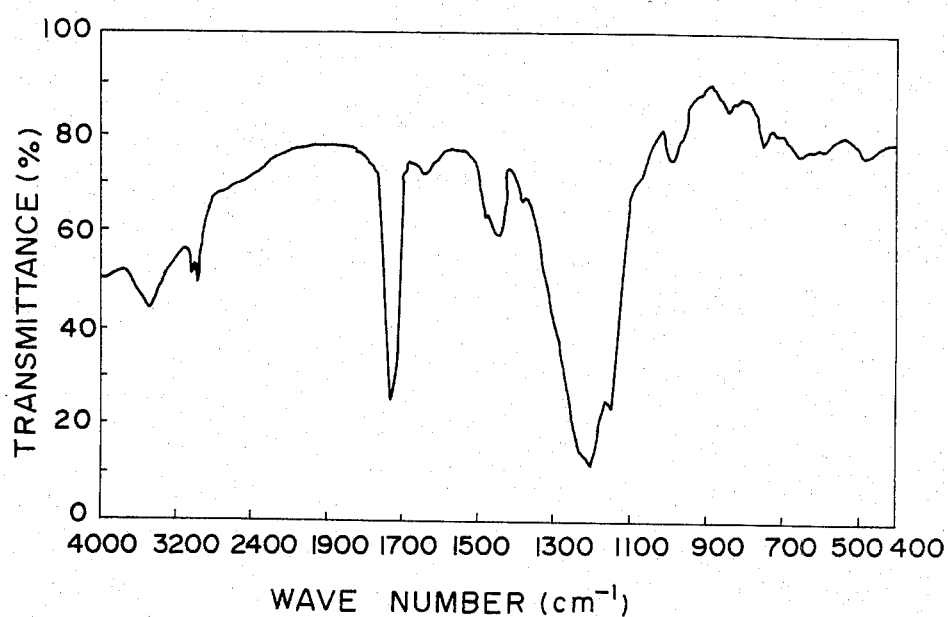
FIG. 1 is a chart showing the infrared absorption spectrum pattern of an organic substance obtained by subjecting a polymer-coated graphite fluoride prepared by a method embodying the present invention to benzene extraction.

The method of the invention is applicable to various inorganic materials as described hereinbefore. In every case it is preferable that the inorganic material is in the form of fine particles such as particles smaller than 100 μm in mean particle size.

As to the material for the polymer coating, an almost free selection can be made from vinylic monomers that undergo radical polymerization, and where desired it is possible to jointly use two or more kinds of vinylic monomers which undergo radical copolymerization.

Examples of useful compounds having vinyl bond are acrylic acid, methacrylic acid, acrylates, methacrylates, acrylic esters, methacrylic esters, acrylonitrile, N-methylolacrylamide, vinyl chloride, vinyl acetate, styrene, divinylbenzene and vinylidene fluoride.

In the polymer-coated inorganic material, the content of the vinylic polymer should be at least 0.5% by weight in order to produce a substantial improvement on the dispersing property. In theory there is no clear upper boundary of the polymer content in the coated material, but in practice it is important that the coated inorganic material sufficiently exhibits the desired characteristics thereof and therefore it is preferred to limit the polymer content in the coated material at 50% by weight. Within these limitations, the polymer content in the coated material can freely be determined by adjusting the proportion of the vinylic monomer to the inorganic material.

In the method according to the invention, it is a normal way to disperse a desired inorganic material and vinylic monomer in either a mixture of water and an organic solvent which is soluble in water or a mixture of water and a surface-active agent. The organic solvent can be selected from, for example, alcohols typified by methanol and ethanol, ketones typified by acetone, ethers and amines. The most preferable solvent is ethanol particularly because the use of ethanol is effective for enhancement of the grafting efficiency, which is herein defined as the weight ratio of the vinylic polymer bonded to the inorganic material particles by graft polymerization to the vinylic monomer subjected to the polymerization reaction. The organic solvent is used in an amount sufficient for good dispersion of the inorganic material in the resultant aqueous medium, but it is unfavorable to use an excessively large amount of organic solvent because it will cause lowering of the grafting efficiency. In the case of ethanol, a preferred range of the proportion of water to ethanol is from 0.1:1 to 2.3:1 by weight. The surface-active agent may be anionic, cationic or nonionic, or may be a mixture of surface-active agents of different types. As mentioned hereinbefore it is also possible to use an organic liquid alone as the liquid medium for the dispersion.

As to the polymerization initiator for the selected vinylic monomer, it is suitable to use a water-soluble initiator such as sulfur dioxide, aqueous solution of sulfurous acid, aqueous solution of a hydrogensulfite, potassium persulfate, azobiscyanovaleric acid or 2,2'-azobis-(2-amidinopropane)-dihydrochloride.

It is suitable to prepare an aqueous dispersion system by adding 1 to 100 parts by weight of the selected inorganic material and 0.1 to 100 parts by weight of vinylic monomer in a mixture of 100 parts by weight of water and either 1 to 100 parts by weight of organic solvent or 1 to 50 parts by weight of surface-active agent and well stirring the resultant mixture. Then a polymerization initiator is added to the aqueous dispersion and stirring is continued. It suffices that the polymerization initiator amounts to 0.01 to 20% by weight of the vinylic monomer.

After the addition of the polymerization initiator, the pH of the aqueous reaction system is raised to a value in the range from 5 to 9.

The range of the adjusted pH of the reaction system is specified to be from 5 to 9 firstly because the effect of the adjustment remains insufficient if the adjusted pH is still below 5 and secondly because when the pH exceeds 9 there arises a possibility of decomposition of the inorganic material. The adjustment of the pH can be accomplished by adding an alkaline material such as an alkali metal hydroxide, alkali metal carbonate, aqueous ammonia, ammonia gas or ammonium salt to the polymerization reaction system after the addition of the polymerization initiator. Alternatively, the same object is accomplished by treating the inorganic material particles with an alkaline solution or gas in advance of the preparation of the polymerization reaction system.

After the adjustment of pH the vinylic monomer in the aqueous dispersion undergoes radical polymerization and graft polymerization even at room temperature. However, it is favorable to maintain the reaction system at an adequately elevated temperature such as about 50° to 70° C. to thereby enhance the rate of polymerization and complete the polymerization reaction in a shortened time. By this process a high degree of polymerization can be achieved in a relatively short reaction time such as 1 to 5 hr.

After completion of the polymerization reaction, the reacted slurry is filtered to separate the solid component which is a polymer-coated inorganic material in powder form, and the polymer-coated material is thoroughly washed with water and dried.

In the case of performing the polymerization reaction by the aforementioned semi-dry process, only very small quantities of water and organic solvent are used so that the inorganic material and vinylic monomer are only wetted with the liquid medium rather than dispersed therein. When such semi-dry process is taken into consideration, suitable proportions of the materials in the method according to the invention can be expressed as follows. For 100 parts by weight of inorganic material particles, it is suitable to use 0.1 to 600 parts by weight of water, 0.1 to 300 parts by weight of an organic solvent soluble in water or 0.1 to 150 parts by weight of a surface-active agent, 0.1 to 100 parts by weight of vinylic monomer(s), and a polymerization initiator amounting to 0.01 to 20% by weight of the vinylic monomer(s).

Also in the case of the semi-dry process it is necessary to adjust the pH of the reaction system to 5–9. In this case it is convenient to perform alkali treatment of the inorganic material particles in advance of mixing with vinylic monomer and water. If it is desired to perform the adjustment of pH after preparation of the polymerization reaction system, it is suitable to use a gaseous alkali such as ammonia gas.

In the semi-dry process, there is no need of filtering the reaction system after completion of the polymerization reaction, and a polymer-coated inorganic material is obtained by thoroughly washing the reaction product with water and drying the washed product. The semi-dry process has advantages such as the possibility of treating a large quantity of inorganic material particles in a reaction vessel of a relatively small capacity, great decrease in the consumption of organic solvent or elimination of a solvent recovery process, and simplification of the product recovery operations. However, the grafting efficiency in the semi-dry process remains lower than that in the normal process using an aqeous dispersion when there is no difference in other factors of the reaction.

By the method according to the invention it is possible to almost ideally coat fine particles of a desired inorganic material with a vinylic polymer even when the proportion of the polymer to the inorganic material is very small. A polymer-coated inorganic material prepared by this method is superior in its important properties such as affinity for water or organic substances and capability of dispersing in various liquids to the product of a resembling method which utilizes the same starting materials but leaves the pH of the polymerization reaction system at a level below 5. Where the method of the invention is used for the preparation of a polymer-coated solid lubricant such as a polymer-coated graphite fluoride, it is possible to obtain a polymer-coated solid lubricant which exhibits very good dispersing property in various liquid or semi-liquid media although the thickness of the polymer coating is very thin, and the polymer-coated solid lubricant can produce stable and continuous lubricating films which are almost equivalent to films of pure solid lubricant powder.

A polymer-coated inorganic material prepared by the method of the invention, even in the case of a polymer-coated graphite fluoride, has good formability so that it is possible to compact this material alone into a solid body of a desired shape by application of adequate pressure and heat. The good dispersing property of the polymer-coated inorganic material is exhibited also in press-shaping of this material, so that the shaped body has a dense and tight structure.

By using a mixture of the polymer-coated inorganic material and a suitable synthetic resin powder, it becomes more easy to produce press-shaped bodies of various shapes and the strength of the shaped bodies can be enhanced. Various resins are useful for this purpose, and phenolic resin, polymethyl methacrylate resin, polyacetal resin and ABS resin can be named as preferred examples. In principle there is no strict limitation to the amount of the resin to be added, but from the viewpoint of fully utilizing the favorable characteristics of the inorganic material it is preferred to limit the amount of the resin such that the total weight of the polymer coated on the inorganic material particles and the resin added for press-shaping does not exceed the weight of the inorganic material in the resultant mixture.

The press-shaping of a mixture of the polymer-coated inorganic material and a selected resin in powder form is accomplished by a usual method which may use a metal die set. As to the press-shaping conditions, usually it suffices to apply a pressure of 150–450 kg/cm$^2$ while the mixture is kept heated to 100°–250° C., though most suitable pressure and temperature are variable depending on the kinds of the vinylic polymer coated on the inorganic material and the resin mixed with the polymer-coated material.

Owing to good dispersing property and affinity for resins, press-shaping of the polymer-coated inorganic material added with a resin gives a tightly compacted solid body in which the polymer-coated inorganic material particles are very uniformly distributed. The press-shaped bodies are excellent in physical properties, and it is possible to produce even intricately shaped bodies.

Though unessential, it is possible to add any auxiliary material selected from conventional additives used in press-shaping of synthetic resins and/or inorganic materials to a mixture of the polymer-coated inorganic material and a selected resin.

The product of the method according to the invention, either in particulate form or in compacted form, has greatly widened uses compared with analogous polymer-coated inorganic materials prepared by hitherto proposed methods. Typical examples of the wide uses are listed in the following.

(1) Preparation of composite materials

A variety of composite materials can be obtained by mixing a polymer-coated solid lubricant prepared by the method of the invention with natural or synthetic rubber, synthetic resin, glass fiber, ceramics, graphite or other carbonaceous material, asphalt, tar and/or pitch. Shaped members of such composite materials are useful as self-lubricating bearings and sealing elements such as packings and gaskets, and it is also possible to form some of these composite materials into fibers. Since the polymer coating according to the invention is firmly bonding to the solid lubricant particles, in the uses of these composite materials very stable lubricating film can be formed on the sliding contact face, and therefore the shaped members are very low in the rate of abrasion and can endure severe frictions represented by large values of the product of the applied pressure by the velocity of relative movement of the shaped member.

Examples of synthetic rubbers for this use are styrene rubber, butadiene rubber, chloroprene rubber, butyl rubber, nitrile rubber, ethylene-propylene rubber, Hypalon or chlorosulfonated polyethylene rubber, acrylic rubber, urethane rubber, fluorine rubber, silicone rubber, thiokol and ethylene-vinyl acetate rubber.

Examples of synthetic resins for this use are phenolic resin, urea resin, melamine resin, aniline resin, unsaturated polyester resin, diallyl phthalate, epoxy resin, alkyd resin, polyimido, silicone resin, polyethylene, polypropylene, polystyrene, polymethyl methacrylate, polyacrylonitrile, polyvinyl butyral, polyamide, ABS resin, polycarbonate, polyacetal, polyethyleneterephthalate, polyphenylene oxide, polyphenylene sulfide, polysulfone, polyurethane, ionomer resin, fluorine resin and cellulose base plastics.

(2) Addition to lubricating oil or grease

The polymer-coated solid lubricant in particulate form is added to various lubricating oils and greases for use as gear oil, spindle oil, refrigerator oil, dynamo oil, turbine oil, machine oil, cylinder oil, lubricating oil for reciprocating engines of aircraft, marine engine oil, fiber grease, cup grease, glass fiber grease, automotive bearing grease and ball-and-roller bearing grease for example.

As for the aforementioned lubricating oils, polyolefins, glycols, carboxylic acid esters, phosphoric acid esters, silicones, perfluorocarbons and chlorinated aromatic compounds are named as useful materials. As for the aforementioned greases, calcium soap grease, sodium soap grease, aluminum soap grease, barium soap grease, mixed soap grease, calcium complex soap grease, barium complex soap grease, and non-soap greases that utilize non-soap materials such as bentonite or fine silica as viscosity modifier are named as examples.

(3) Application to form dry film for lubrication

The polymer-coated solid lubricant in particulate form, either singly or jointly with an organic or inorganic binder, is applied to sliding contact faces of various apparatus in the manner of coating to thereby form a dry and lubricating film which serves for the purpose of permanent lubrication, fitting at intial stage of operation or releasing.

(4) Use as releasing agent

The polymer-coated solid lubricant in particulate form is useful as a lubricating and releasing agent in die-casting and press-shaping operations for the production of sintered alloy bodies, shaped plastic bodies or shaped rubber bodies for example. For this use, the polymer-coated solid lubricant may be dispersed in a liquid or gas for spraying onto the desired surfaces.

(5) Use in metal machining

In metal machining operations such as cutting, rolling, drawing, pressing, grinding and polishing, the polymer-coated solid lubricant in particulate form is added to cutting oil, rolling oil, pressing oil, grinding oil and polishing liquid for the purpose of augmenting the lubricating effect of the oils.

It should be noted that the above listed uses are only exemplary, and that a polymer-coated inorganic material obtained by the method of the invention is useful in the entire areas of the application of the inorganic material and in almost every case offers many advantages over the use of an analogous polymer-coated inorganic material prepared by a known method.

Hereinafter some examples are presented to illustrate the present invention without the least intention of limiting the invention in any respect.

EXAMPLE 1

A three-necked one-liter flask was held immersed in a constant temperature bath maintained at 60° C., and 280 ml of water, 200 ml of ethanol, 100 g of graphite fluoride $(CF)_n$ and 25 g of methyl methacrylate monomer were charged into the flask. The graphite fluoride was in the form of fine particles obtained by pulverization in a jet mill and passed through a 300-mesh sieve. Stirring the mixture in the flask, 20 ml of 6% aqueous solution of sulfurous acid was added to initiate polymerization of methyl methacrylate. At this stage the pH of the aqueous reaction system was about 2. Soon the pH of this reaction system was raised to 7.7 by adding aqueous solution of sodium hydroxide to the reaction system. After that, stirring of the reaction system was continued for 4 hr. Then the solid component of the reacted slurry was separated from the liquid by filtration, thoroughly washed with water and then dried at 80° C. in vacuum to obtain a powdery product which weighed 122.5 g in dry state.

Figure 2:
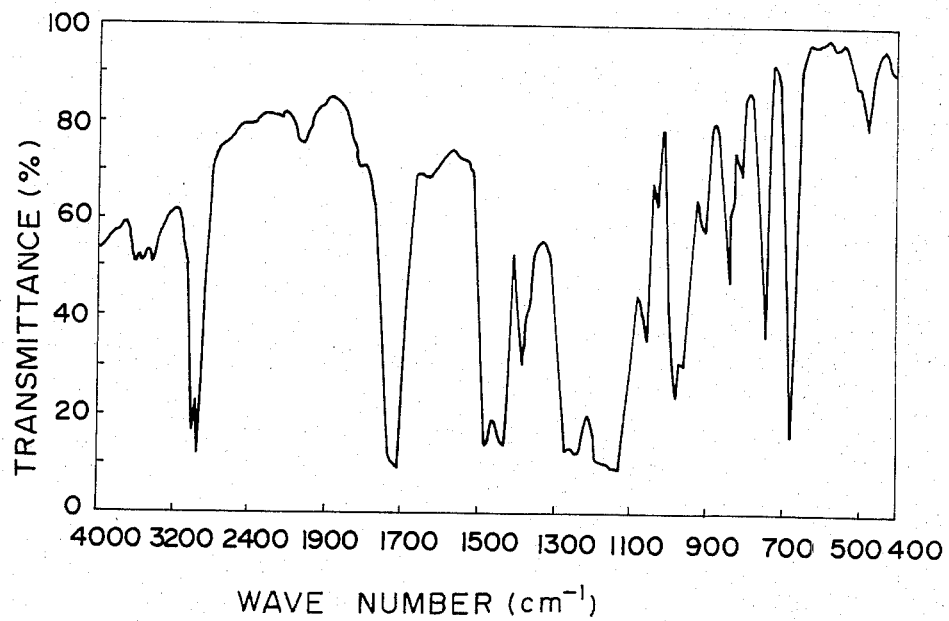
FIG. 2 shows the infrared absorption spectrum pattern of the undissolved residue of the aforementioned benzene extraction.

By microscopic observation it was confirmed that the graphite fluoride particles were well coated with polymerized methyl methacrylate without recognizing the existence of the methacrylate polymer independent of the graphite fluoride particles. The polymer-coated graphite fluoride was subjected to benzene extraction for 48 hr, and both the extract and the solid remained undissolved in benzene were subjected to infrared absorption spectrum analysis. FIG. 1 shows the infrared absorption spectrum pattern of the extract and FIG. 2 shows that of the undissolved solid. By this analysis the extract was confirmed to be homopolymer of polymethyl methacrylate, and also it was confirmed that the absorption spectrum of the undissolved solid was in agreement with the spectrum of polymethyl methacrylate. These facts evidenced the realization of graft bonding of polymethyl methacrylate to the surfaces of the graphite fluoride particles. The polymer-coated graphite fluoride was subjected to thermogravimetric analysis (TGA), which revealed that the content of polymethyl methacrylate in the coated graphite fluoride calculated from the weight loss was 18.4% by weight.

Also in the following examples, the above described microscopic observation, infrared absorption spectrum analysis and thermogravimetric analysis were carried out to confirm graft bonding of vinylic polymer to the inorganic material particles and to measure the polymer content in the coated material.

For comparison, this process was repeated generally similarly except that the addition of sodium hydroxide was omitted. That is, the pH of the aqueous reaction system was left at about 2.

The polymer-coated graphite fluoride obtained in this case was 113.8 g in dry weight and contained 12.1% by weight of polymethyl methacrylate, so that the grafting efficiency was calculated to be 55%.

EXAMPLE 2

Using the same apparatus as in Example 1, 250 ml of water, 200 ml of ethanol, 100 g of graphite fluoride $(C_2F)_n$ and 30 g of methyl methacrylate monomer were mixed by stirring, while the constant temperature bath was maintained at 60° C. The graphite fluoride was in the form of fine particles obtained by pulverization in a jet mill and passed through a 250-mesh sieve. Continuing the stirring, 50 ml of 4% aqueous solution of 2,2'-azobis-(2-amidinopropane)-dihydrochloride was added to the mixture as a polymerization initiator. At this stage the pH of the aqueous reaction system was about 3. Soon after the addition of the polymerization initiator, sodium hydroxide was added in order to adjust the pH of the reaction system to 7.0. After the adjustment of the pH, stirring of the reaction system was continued for 3 hr. Then the reacted slurry was filtered to separate the solid component, which was thoroughly washed with water and dried at 80° C. in vacuum.

The polymer-coated graphite fluoride obtained by this process weighed 128.5 g in dry state and contained 22.2% by weight of polymethyl methacrylate. In this process the grafting efficiency was calculated to be 95%.

For comparison, this process was repeated generally similarly except that the addition of sodium hydroxide was omitted. That is, the pH of the aqueous reaction system was left at about 3.

The polymer-coated graphite fluoride obtained in this case was 118.3 g in dry weight and contained 15.5% by weight of polymethyl methacrylate, so that the grafting efficiency was calculated to be 61%.

EXAMPLE 3

Figure 3:
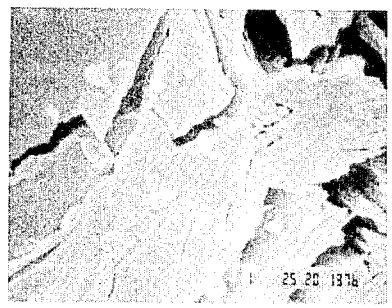
FIG. 3 is a micrograph of particulate graphite fluoride used in an example of the invention.

Using the same apparatus as in the preceding examples, 250 ml of water, 250 ml of ethanol, 100 g of the graphite fluoride $(CF)_n$ mentioned in Example 1 and 30 g of methyl acrylate monomer were mixed by stirring, while the constant temperature bath was maintained at 60° C. FIG. 3 is a micrograph of the graphite fluoride used in this example. Continuing the stirring, 20 ml of 6% aqueous solution of sulfurous acid was added to the mixture in the flask. At this stage the pH of the aqueous reaction system was about 2. Soon after the addition of the sulfurous acid solution, aqueous solution of potassium hydroxide was added so as to adjust the pH of the reaction system to 6.5. After the adjustement of the pH, stirring of the reaction system was continued for 3 hr. Then the reacted slurry was filtered to separate the solid component, which was thoroughly washed with water and dried at 70° C. in vacuum.

Figure 4:
FIG. 4 is a micrograph of a polymer-coated graphite fluoride prepared by using the graphite fluoride of FIG. 3.

FIG. 4 is a micrograph of the polymer-coated graphite fluoride obtained by this process. This product weighed 129.4 g in dry state and contained 22.7% by weight of polymethyl acrylate, so that the grafting efficiency was calculated to be 98%.

For comparison, this process was repeated generally similarly except that the addition of potassium hydroxide solution was omitted. That is, the pH of the aqueous reaction system was left at about 2.

Figure 5:
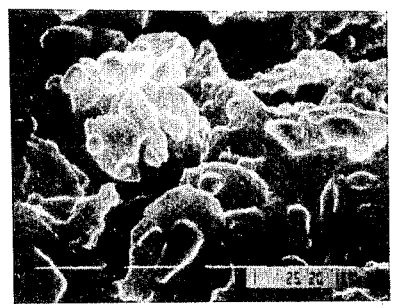
FIG. 5 is a micrograph of a polymer-coated graphite fluoride prepared by a method resembling to the method of the invention but not including the pH adjusting step according to the invention.

The polymer-coated graphite fluoride obtained in this case was 115.3 g in dry weight and contained 13.3% by weight of polymethyl acrylate, so that the grafting efficiency was calculated to be 51%. FIG. 5 is a micrograph of the polymer-coated graphite fluoride obtained in this case.

EXAMPLE 4

Using the same apparatus as in the preceding examples, 250 ml of water, 200 ml of methanol, 100 g of the graphite fluoride $(C_2F)_n$ used in Example 2 and 20 g of methyl acrylate monomer were mixed by stirring, while the constant temperature bath was maintained at 60° C. Continuing the stirring, 50 ml of 4% aqueous solution of 2,2'-azobis-(2-amidinopropane)-dihydrochloride was added to the mixture as polymerization initiator. At this stage the pH of the aqueous reaction system was about 3. Soon after the addition of the initiator, the pH of the reaction system was adjusted to 5.4 by adding aqueous solution of sodium hydroxide. After the adjustment of pH, stirring of the reaction system was continued for 4 hr. Then the reacted slurry was filtered to separate the solid component, which was thoroughly washed with water and dried at 70° C. in vacuum.

The polymer-coated graphite fluoride obtained by this process weighed 118.0 g in dry state and contained 15.3% by weight of polymethyl acrylate. In this case the grafting efficiency was 90%.

For comparison, this process was repeated generally similarly except that the addition of sodium hydroxide was omitted. That is, the pH of the aqueous reaction system was left at about 3. The polymer-coated graphite fluoride obtained in this case weighed 109.4 g in dry state and contained 8.6% by weight of polymethyl acrylate, so that the grafting efficiency was 47%.

EXAMPLE 5

Using the same apparatus as in the preceding examples, 250 ml of water, 200 ml of methanol, 100 g of the graphite fluoride $(CF)_n$ used in Example 1 and 20 g of methyl methacrylate monomer were mixed by stirring, while the constant temperature bath was maintained at 60° C. Continuing the stirring, 50 ml of 4% aqueous solution of the polymerization initiator used in Example 4 was added to the mixture in the flask. At this stage the pH of the aqueous reaction system was about 3. Soon after the addition of the polymerization initiator, the pH of the reaction system was adjusted to 8.5 by adding sodium hydroxide. After that, stirring of the reaction system was continued for 4 hr. Then the reacted slurry was filtered to separate the solid component, which was washed with water and dried at 70° C. in vacuum.

The polymer-coated graphite fluoride obtained by this process weighed 119.4 g in dry state and contained 16.2% by weight of polymethyl methacrylate. In this case the grafting efficiency was 97%.

For comparison, this process was repeated generally similarly except that the addition of sodium hydroxide was omitted. That is, the pH of the aqueous reaction system was left at about 3. The polymer-coated graphite fluoride obtained in this case weighed 110.8 g in dry state and contained 9.7% by weight of polymethyl methacrylate, so that the grafting efficiency was 54%.

EXAMPLE 6

Using the same apparatus as in the preceding examples, 200 ml of water, 200 ml of ethanol, 100 g of the graphite fluoride $(CF)_n$ used in Example 1 and 30 g of acrylonitrile monomer were mixed by stirring, while the constant temperature bath was maintained at 60° C. Continuing the stirring, 50 ml of 4% aqueous solution of the polymerization initiator used in Example 4 was added to the mixture in the flask. At this stage the pH of the aqueous reaction system was about 3. Soon after the addition of the polymerization initiator, the pH of the reaction system was adjusted to 7.1 by adding sodium hydroxide. After that, stirring of the reaction system was continued for 3 hr. Then the reacted slurry was filtered to separate the solid component, which was washed with water and dried at 80° C. in vacuum.

The polymer-coated graphite fluoride obtained by this process weighed 127.0 g in dry state and contained 21.3% by weight of polyacrylonitrile. In this case the grafting efficiency was 90%.

For comparison, this process was repeated generally similarly except that the addition of sodium hydroxide was omitted. That is, the pH of the reaction system was left at about 3. The polymer-coated graphite fluoride obtained in this case weighed 118.0 g and contained 15.3% by weight of polyacrylonitrile, so that the grafting efficiency was 60%.

EXAMPLE 7

Using the same apparatus as in the preceding examples, 250 ml of water, 200 ml of ethanol, 100 g of the graphite fluoride $(CF)_n$ used in Example 1 and 20 g of styrene monomer were mixed by stirring, while the constant temperature bath was maintained at 60° C. Continuing the stirring, 50 ml of 4% aqueous solution of the polymerization initiator used in Example 4 was added to the mixture in the flask. At this stage the pH of the aqueous reaction system was about 3. Soon after the addition of the polymerization initiator, the pH of the reaction system was adjusted to 7.1 by adding sodium hydroxide. After that, stirring of the reaction system was continued for 3 hr. Then the reacted slurry was filtered to separate the solid component, which was thoroughly washed with water and dried at 80° C. in vacuum.

The polymer-coated graphite fluoride obtained by this process weighed 118.2 g in dry state and contained 15.4% by weight of polystyrene. In this case the grafting efficiency was 91%.

For comparison, this process was repeated generally similarly except that the adjustment of pH by the addition of sodium hydroxide was omitted. The polymer-coated graphite fluoride obtained in this case weighed 111.0 g and contained 9.9% by weight of polystyrene, so that the grafting efficiency was 55%.

EXAMPLE 8

Using the same apparatus as in the preceding examples, 280 ml of water, 200 ml of ethanol, 100 g of the graphite fluoride $(CF)_n$ used in Example 1 and 6 g of methyl methacrylate monomer were mixed by stirring, while the constant temperature bath was maintained at 60° C. Continuing the stirring, 20 ml of 4% aqueous solution of the polymerization initiator used in Example 4 was added to the mixture in the flask. At this stage the pH of the aqueous reaction system was about 3. Soon after the addition of the polymerization initiator, the pH of the reaction system was adjusted to 7.5 by adding sodium hydroxide. After that, stirring of the reaction system was continued for 5 hr. Then the reacted slurry was filtered to separate the solid component, which was thoroughly washed with water and dried at 70° C. in vacuum.

The polymer-coated graphite fluoride obtained by this process weighed 105.4 g in dry state and contained 5.1% by weight of polymethyl methacrylate. In this case the grafting efficiency was 90%.

For comparison, this process was repeated generally similarly except that the adjustment of pH by the addition of sodium hydroxide was omitted. The polymer-coated graphite fluoride obtained in this case weighed 102.7 g in dry state and contained 2.6% by weight of polymethyl methacrylate, so that the grafting efficiency was 45%.

To evaluate the dispersing property of the polymer-coated graphite fluoride obtained in Example 8 in oil, 1 part by weight of this polymer-coated graphite fluoride was added to 100 parts by weight of No. 40 turbine oil at room temperature, and mixing was performed by means of a homomixer which was operated for 10 min at 10000 rpm. Then the mixture was kept in a centrifugal separator operated at 3000 rpm for 5 min, and thereafter the mixture was left standing at room temperature. After the lapse of 60 min, still the polymer-coated graphite fluoride particles remained almost uniformly dispersed in the oil though sedimentation of a small portion of the particles was recognized.

For comparison, the untreated graphite fluoride used as the starting material in Example 8 were dispersed in the same turbine oil by the same procedure. After withdrawal from the centrifugal separator, the graphite fluoride particles in the oil almost entirely underwent sedimentation within a period of 15 min.

EXAMPLE 9

As a pretreatment, 110 g of the graphite fluoride $(CF)_n$ described in Example 1 was dispersed in a mixture of 200 ml of ethanol and 300 ml of water, followed by the addition of sodium hydroxide to adjust the pH of the mixture to about 10, and the resultant mixture was stirred for 30 min. After that, the graphite fluoride was recovered, washed with water and dried at 80° C. in vacuum.

Using the same apparatus as in the preceding examples 250 ml of water, 200 ml of ethanol, 100 g of the alkali-treated graphite fluoride and 20 g of methyl methacrylate monomer were mixed by stirring, while the constant temperature bath was maintained at 65° C. Continuing the stirring, 50 ml of 6% aqueous solution of $SO_2$ was added to the mixture in the flask. At th:s stage the pH of the aqueous reaction system was about 5. After that, stirring of the reaction system was continued for 4 hr. Then the reacted slurry was filtered to separate the solid component, which was thoroughly washed with water and dried at 80° C. in vacuum.

The polymer-coated graphite fluoride obtained by this process weighed 118.2 g in dry state and contained 15.4% by weight of polymethyl methacrylate. In this case the grafting efficiency was 91%.

EXAMPLE 10

The polymer-coated graphite fluorides prepared in Examples 1, 2, 4, 6, 7 and 8 by adjusting the pH of the polymerization reaction systems were individually subjected to press-shaping to produce a cylindrical solid body. Without adding any extra material to each polymer-coated graphite fluoride, the press-shaping was performed at 180° C. by applying a pressure of 250 kg/cm$^2$ for 10 min. In every case it was easy to achieve the press-shaping, and the polymer-coated graphite fluoride particles were uniformly distributed in the press-shaped body. The press-shaped bodies were subjected to bending strength test, of which the results are presented in the following Table 1. For comparison, the polymer-coated graphite fluorides prepared in the same Examples without adjusting the pH of the polymerization reaction systems were individually subjected to the same press-shaping operation. Also in these cases the polymer-coated graphite fluoride particles were uniformly distributed in every shaped-body. Table 1 contains the results of the bending strength test on the shaped bodies of these polymer-coated graphite fluorides. In the Table, "PMMA" refers to polymethyl methacrylate and "PMA" to polymethyl acrylate.

TABLE 1

| Graphite Fluoride | Polymer-coated by adjusting pH | | Polymer-coated without adjusting pH (Reference) | |
|---|---|---|---|---|
| | Content of Grafted Polymer (Wt. %) | Bending Strength (kg/cm$^2$) | Content of Grafted Polymer (Wt. %) | Bending Strength (kg/cm$^2$) |
| Ex. 1 coated (CF)$_n$ | 18.4 (PMMA) | 378 | 12.1 | 280 |
| Ex. 2 coated (C$_2$F)$_n$ | 22.2 (PMMA) | 390 | 15.5 | 318 |
| Ex. 4 coated (C$_2$F)$_n$ | 15.3 (PMMA) | 319 | 8.6 | 203 |
| Ex. 6 coated (CF)$_n$ | 21.3 (polyacrylo-nitrile) | 351 | 15.3 | 275 |
| Ex. 7 coated (CF)$_n$ | 15.4 (poly-styrene) | 233 | 9.9 | 219 |
| Ex. 8 coated (CF)$_n$ | 5.1 (PMMA) | 90 | 2.6 | 47 |

For comparison, the untreated graphite fluorides (CF)$_n$ and (C$_2$F)$_n$ used respectively as starting materials in Examples 1 and 2 were subjected to the above described press-shaping. Prior to the press-shaping, each of these untreated graphite fluorides was mixed in a dry state with the resin corresponding to the polymer coating formed in Example 1, 2, 4, 6, 7 or 8 such that the resin content in the resultant mixture became in agreement with the polymer content in the polymer-coated graphite fluoride of Example 1, 2, 4, 6, 7 or 8. In every case, however, it was impossible to achieve the intended press-shaping under the shaping condition described in Example 10, or the press-shaped body was too weak and fragile to measure its bending strength.

Also for comparison, the untreated graphite fluoride (CF)$_n$ used in Example 1 was mixed with powdered polymethyl methacrylate in the proportion of 1:1 by weight, and the resultant mixture was press-shaped by the same method and under the same condition as in Example 10. In this case the press-shaping was possible, but the distribution of the graphite fluoride particles was far from uniformity and was unsatisfactory. The bending strength of the press-shaped body was measured to be 17 kg/cm$^2$.

EXAMPLE 11

The polymer-coated graphite fluoride prepared in Example 8 by adjusting the pH of the polymerization reaction system was mixed in dry state with a powdered polymethyl methacrylate resin, phenolic resin, ABS resin or polyacetal resin each in the proportion as shown in the following Table 2, and every mixture was press-shaped into a solid cylindrical body under the same shaping condition as in Example 10. In every case the press-shaping was easily achieved, and there was no difficulty in releasing the shaped body from the metal die. By microscopic observation it was confirmed that the polymer-coated graphite fluoride particles were uniformly distributed in every shaped body. The results of bending strength test on the press-shaped bodies are presented in Table 2.

For comparison, the untreated graphite fluoride (CF)$_n$ used as the starting material in Example 8 was subjected to the above described press-shaping. The untreated graphite fluoride was mixed with each of the aforementioned resins as shown in Table 2, and the press-shaping was performed under the aforementioned shaping condition. By microscopic observation of the press-shaped bodies it was found that the distribution of the graphite fluoride particles in every sample was for from uniformity. As can be seen in Table 2, in some cases it was impossible to achieve the pressure-shaping, and the press-shaped bodies were very low in bending strength.

TABLE 2

| Graphite Fluoride | Content of Grafite Polymer (Wt. %) | Resin Added to 10 g of Graphite Fluoride | Bending Strength (kg/cm$^2$) |
|---|---|---|---|
| Example 8 coated (CF)$_n$ | 5.1 (PMMA) | PMMA 1.0 g | 300 |
| Example 8 coated (CF)$_n$ | 5.1 (PMMA) | PMMA 7.5 g | 375 |
| Example 8 coated (CF)$_n$ | 5.1 (PMMA) | phenolic 3.0 g | 330 |
| Example 8 coated (CF)$_n$ | 5.1 (PMMA) | ABS 6.0 g | 360 |
| Example 8 coated (CF)$_n$ | 5.1 (PMMA) | acetal 3.0 g | 325 |
| Reference untreated (CF)$_n$ | — | PMMA 1.5 g | could not be shaped |
| Reference untreated (CF)$_n$ | — | PMMA 5.0 g | 18 |
| Reference untreated (CF)$_n$ | — | phenolic 5.0 g | 20 |
| Reference untreated (CF)$_n$ | — | ABS 5.0 g | 17 |
| Reference untreated (CF)$_n$ | — | acetal 7.0 g | 29 |

EXAMPLE 12

A three-necked one-liter flask was held in a constant temperature bath maintained at 60° C., and 250 ml of water, 200 ml of ethanol, 100 g of powdered molybdenum disulfide and 12 g of methyl acrylate monomer were mixed in the flask by stirring. Continuing the stirring, 50 ml of 4% aqueous solution of 2,2'-azobis-(2-amidinopropane)-dihydrochloride was added to the mixture. At this stage the pH of the aqueous reaction system was about 2. Then the pH of the reaction system was adjusted to 8.5 by adding aqueous solution of sodium hydroxide. After that, stirring of the reaction system was continued for 4 hr to complete polymerization reaction. Then the reacted slurry was filtered to separate the solid component, which was thoroughly washed with water and dried at 80° C. in vacuum.

The powdery product of this process weighed 111.6 g in dry state and was confirmed to contain 10.4% by weight of polymethyl acrylate graft-bonded to the surfaces of molybdenum disulfide particles. In this case the grafting efficiency was 97%.

The process was repeated generally similarly except that the pH was adjusted to 7.0 by decreasing the quantity of sodium hydroxide used for the adjustment purpose. The polymer-coated molybdenum disulfide obtained in this case weighed 118.4 g in dry state and contained 15.5% by weight of polymethyl acrylate. The grafting efficiency was 92%.

The process of this example was again repeated generally similarly except that the adjustment of the pH was omitted. That is, the pH of the aqueous reaction system was left at about 2. The polymer-coated molybdenum disulfide obtained in this case weighed 106.4 g in dry state and contained 6.0% by weight of polymethyl acrylate. The grafting efficiency was 53%.

EXAMPLE 13

Using the same apparatus as in Example 12, 480 ml of water, 100 g of powdered graphite of natural occurrence and 20 g of methyl acrylate monomer were mixed by stirring. Continuing the stirring, 20 ml of 6% aqueous solution of sulfurous acid was added to the mixture in the flask. At this stage the pH of the aqueous reaction system was about 2. Then the pH of the reaction system was adjusted to 7.3 by adding aqueous solution of sodium hydroxide. After that, stirring of the reaction system was continued for 4 hr to complete polymerization reaction. Then the reacted slurry was filtered to separate the solid component, which was thoroughly washed with water and dried at 80° C. in vacuum.

The powdery product of this process weighed 119.2 g in dry state and was confirmed to contain 16.1% by weight of polymethyl acrylate graft-bonded to the surfaces of the graphite particles. In this case the grafting efficiency was 96%.

This process was repeated generally similarly except that the addition of sodium hydroxide for adjustment of the pH was omitted. The polymer-coated graphite obtained in this case weighed 111.8 g in dry state and contained 10.6% by weight of polymethyl acrylate, so that the grafting efficiency was 59%.

The following Examples 14–16 illustrate the preparation of polymer-coated graphite fluoride according to the invention by a semi-dry process characterized by an extremely small quantity of the liquid medium in the graft polymerization process.

EXAMPLE 14

As a pretreatment, 500 g of the graphite fluoride $(CF)_n$ described in Example 1 was dispersed in a mixture of 1500 g of water and 1000 g of ethanol contained in a 5-liter beaker, followed by the addition of 10% aqueous solution of sodium hydroxide to adjust the pH of the mixture to 9 while continuing stirring of the mixture. As the pH lowered from 9 by reason of the consumption of the added sodium hydroxide in a neutralizing reaction, the sodium hydroxide solution was further added so as to raise the pH to 9. This procedure was repeated until the pH of the mixture became almost unchanged from 9, and after that stirring was further continued for 30 min. Then the slurry-like mixture was filtered to separate the graphite fluoride particles, which were washed with water and dried. About 500 g of alkali-treated graphite fluoride $(CF)_n$ was obtained by this treatment.

A three-necked flask having a capacity of one liter was held in a constant temperature bath maintained at 65° C., and 100 g of the alkali-treated graphite fluoride was put into the flask. Then 0.6 g of water and 0.4 g of ethanol were added to the graphite fluoride in the flask with forced stirring. Next, 10 ml of 6% sulfurous acid solution and 10 g of methyl methacrylate monomer were added to the mixture in the flask. After that, stirring of the resultant reaction system was continued for 4 hr to complete polymerization reaction. The product of the polymerization reaction was dried at 80° C. in vacuum for 6 hr.

The product of this process weighed 105.0 g in dry state and was confirmed to be polymer-coated graphite fluoride containing 4.8% by weight of polymethyl methacrylate graft-bonded to the surfaces of the graphite fluoride particles. The grafting efficiency was calculated to be 50%.

The graft polymerization process of this example was repeated generally similarly except that the quantities of the sulfurous acid solution and methyl methacrylate monomer were reduced to 5 ml and to 5 g, respectively. The polymer-coated graphite fluoride obtained in this case weighed 102.3 g in dry state and contained 2.2% by weight of polymethyl methacrylate, so that the grafting efficiency was 46%.

For comparison, the graft polymerization process of Example 14 was carried out by using 100 g of untreated graphite fluoride $(CF)_n$ in place of the alkali-treated graphite fluoride in Example 14. In other respects no modification was made to the graft polymerization process.

The polymer-coated graphite fluoride obtained in this case weighed 102.1 g in dry state and contained 2.1% by weight of polymethyl methacrylate, so that the grafting efficiency was 7%.

EXAMPLE 15

The alkali treatment of graphite fluoride $(CF)_n$ described in Example 14 was performed generally similarly except that an increased quantity of sodium hydroxide was used to thereby adjust the pH of the treatment system to 11.

Using 100 g of the thus treated graphite fluoride, the graft polymerization process of Example 14 was carried out generally similarly but by using 2 g of 2,2'-azobis-(2-amidinopropane)-dihydrochloride instead of the sulfurous acid solution and by increasing the quantity of methyl methacrylate monomer to 30 g.

The polymer-coated graphite fluoride obtained by this process weighed 109.7 g in dry state and contained 8.8% by weight of polymethyl methacrylate. The grafting efficiency was 32%.

The graft polymerization process of this example was again repeated generally similarly but by using 10 ml of the sulfurous acid solution is polymerization initiator and by using 10 g of acrylonitrile monomer instead of methyl methacrylate. The polymer-coated graphite fluoride obtained in this case weighed 104.4 g in dry state and contained 4.2% by weight of polyacrylonitrile, so that the grafting efficiency was 44%.

EXAMPLE 16

A three-necked 3-liter flask was held in a constant temperature bath maintained at 40° C., and 500 g of graphite fluoride $(C_2F)_n$ described in Example 2 was charged into the flask. Stirring the graphite fluoride, ammonia gas was blown into the flask for 30 min at a rate of 100 ml/min. After that the temperature of the bath was raised to 130° C., and this temperature was maintained for 1 hr thereafter. The thus treated graphite fluoride was washed with water and dried.

Using 100 g of the ammonia-treated graphite fluoride, the graft polymerization process of Example 14 (using 10 ml of the sulfurous acid solution and 10 g of methyl methacrylate monomer) was carried out identically.

The polymer-coated graphite fluoride obtained by this process weighed 105.4 g in dry state and contained 5.1% by weight of polymethyl methacrylate. In this case the grafting efficiency was 54%.

For comparison, the graft polymerization process of Example 16 was carried out by using 100 g of untreated graphite fluoride $(C_2F)_n$ in place of the ammonia-treated graphite fluoride in Example 16. In other respects no modification was made to the graft polymerization process.

The polymer-coated graphite fluoride obtained in this case weighed 101.2 g and contained 1.2% by weight of polymethyl methacrylate. Therefore, the grafting efficiency was 12%.

EXAMPLE 17

Graphite fluoride $(CF)_n$ was dispersed in a mixture of water and ethanol, and aqueous solution of sodium hydroxide was added to the dispersion. The resultant mixture was maintained at 60° C. and continuously stirred for 30 min to result in that the mixture exhibited a stable pH value of 7. After filtration, the treated graphite fluoride was washed with water and dried.

A mixture of 100 g of the alkali-treated grpahite fluoride $(CF)_2$ and 300 ml of trifluorortrichloroethane was charged into a 0.5-liter autoclave, and soon 0.2 g of diisopropyl peroxycarbonate employed as a polymerization initiator was added to the mixture in the autoclave. Then the autoclave was closed and cooled by using dry ice and methanol, and air in the autoclave was replaced by nitrogen gas. After solidification of trifluorotrichloroethane, 20 g of vinylidene fluoride monomer was introduced into the autoclave by utilizing a pressure difference. After that the autoclave was kept immersed in a constant temperature bath maintained at 40° C., and the reaction system in the autoclave was continuously stirred at a rate of 500 rpm. At this stage the pressure in the autoclave was about 4 kg/cm² in terms of gauge pressure. After 20 hr from the start of the heating and stirring, the reacted slurry was taken out of the autoclave and filtered to separate the solid component, which was washed with water and dried at 40° C. in vacuum. The dried product was a white powder.

By differential thermal analysis of the white powder using a differential scanning calorimeter, a heat absorption peak was observed at about 170° C. which was taken as the melting temperature of polyvinylidene fluoride. Election micrographs of the white powder showed a coating film on each individual particle of graphite fluoride, and the coating film was considered to be of polyvinylidene fluoride.

The polymer-coated graphite fluoride obtained in this example contained 15.9% by weight of polyvinylidene fluoride, and the grafting efficiency in this example was calculated to be 95%.

For comparison, the polymerization-coating process of Example 17 was repeated generally similarly but by using 100 g of untreated graphite fluoride $(CF)_n$ in place of the alkali-treated graphite fluoride in Example 17. This process too gave a white powder, which was confirmed to be graphite fluoride particles coated with polyvinylidene fluoride. In the dried product the content of polyvinylidene fluoride was 12.2% by weight, and in this case the grafting efficiency was calculated to be 70%.

When dispersed in turbine oil in the manner as described in Example 8, the polymer-coated graphite fluoride of Example 17 obtained from the alkali-treated graphite fluoride exhibited good dispersion ability, and in the same test the comparative product obtained from the untreated graphite fluoride exhibited comparably good dispersion ability.

As an additional test the product of Example 17 and the comparative product were individually subjected to press-shaping in accordance with Example 10. In both cases it was easy to achieve the intended press-shaping. In the case of the product obtained from the alkali-treated graphite fluoride the bending strength of the shaped body was 150 kg/cm², but in the case of the product obtained from the untreated graphite fluoride the bending strength was 120 kg/cm².

What is claimed is:

1. A method of preparing a polymer-coated particulate graphite fluoride, comprising the steps of:
   a. preparing a reaction system by dispersing from 1 to 100 parts by weight of graphite fluoride in the form of fine particles and from 0.1 to 100 parts by weight of at least one vinylic monomer capable of undergoing radical polymerization or radical copolymerization in a liquid medium comprised of 100 parts by weight of water and from 1 to 100 parts by weight of an organic solvent which is soluble in water, followed by adding to said liquid medium from 0.01 to 20% by weight, based on the weight of said at least one vinylic monomer, of a polymerization initiator for said at least one vinylic monomer;
   b. adjusting the pH of said reaction system to a value in the range of from 5 to 9; and
   c. allowing said at least one vinylic monomer to undergo polymerization or copolymerization and to bond to the surfaces of the particles of said graphite fluoride by graft Polymerization.

2. A method according to claim 1 wherein said graphite fluoride is selected from the group consisting of $(CF)_n$, $(C_2F)_n$ and mixtures thereof.

3. A method according to claim 1, wherein the pH of said reaction system is adjusted by adding an alkali to said reaction system.

4. A method according to claim 1, wherein the pH of said reaction system is adjusted by treating said graphite fluoride with a alkali prior to the step of preparing said reaction system.

5. A method according to claim 4, wherein said alkali is in the form of an aqueous solution.

6. A method according to claim 4, wherein said alkali is in the form of a gas.

7. A method of preparing a polymer-coated particulate graphite fluoride, comprising the steps of:
  a. preparing a reaction system by dispersing from 1 to 100 parts by weight of graphite fluoride in the form of fine particles and from 0.1 to 100 parts by weight of at least one vinylic monomer capable of undergoing radical polymerization or radical copolymerization in a liquid medium comprised of 100 parts by weight of water and from 1 to 50 parts by weight of a surface-active agent, followed by adding to said liquid medium from 0.01 to 20% by weight, based on the weight of said at least one vinylic monomer, of a polymerization initiator for said at least one vinylic monomer;
  b. adjusting the pH of said reaction system to a value in the range of from 5 to 9; and
  c. allowing said at least one vinylic monomer to undergo polymerization or copolymerization and to bond to the surfaces of the particles of said graphite fluoride by graft polymerization.

8. A method according to claim 7, wherein said graphite fluoride is selected from the group consisting of $(CF)_n$, $(C_2F)_n$ and mixtures thereof.

9. A method according to claim 7, wherein the pH of said reaction system is adjusted by adding an alkali to said reaction system.

10. A method according to claim 7, wherein the pH of said reaction system is adjusted by treating said graphite fluoride with a alkali prior to the step of preparing said reaction system.

11. A method according to claim 10, wherein said alkali is in the form of an aqueous solution.

12. A method according to claim 10, wherein said alkali is in the form of a gas.

13. A method of preparing a polymer-coated particulate graphite fluoride, comprising the steps of:
  a. preparing a reaction system by wetting 100 parts by weight of graphite fluoride in the form of fine particles and from 0.1 to 100 parts by weight of at least one vinylic monomer capable of undergoing radical polymerization or radical copolymerization with a liquid medium comprised of from 0.1 to 600 parts by weight of water and from 0.1 to 300 parts by weight of an organic solvent which is soluble in water, followed by adding to said liquid medium from 0.01 to 20% by weight, based on the weight of said at least one vinylic monomer, of a polymerization initiator for said at least one vinylic monomer;
  b. adjusting the pH of said reaction system to a value in the range of from 5 to 9; and
  c. allowing said at least one vinylic monomer to undergo polymerization or copolymerization and to bond to the surfaces of the particles of said graphite fluoride by graft polymerization.

14. A method according to claim 13, wherein the pH of said reaction system is adjusted by treating said graphite fluoride with an alkali prior to the step of preparing said reaction system.

15. A method of producing a solid body which comprises a polymer-coated particulate graphite fluoride, the method comprising the steps of:
  a. preparing a powder material comprising fine particles of graphite fluoride coated with a vinylic polymer, the polymer coating being made by a coating method, comprising the steps of:
    (1) preparing a reaction system by dispersing from 1 to 100 parts by weight of graphite fluoride in the form of fine particles and from 0.1 to 100 parts by weight of at least one vinylic monomer capable of undergoing radical polymerization or radical copolymerization in a liquid medium comprised of 100 parts by weight of water and from 1 to 100 parts by weight of an organic solvent which is soluble in water, followed by adding to said liquid medium from 0.01 to 20% by weight, based on the weight of said at least one vinylic monomer, of a polymerization initiator for said at least one vinylic monomer;
    (2) adjusting the pH of said reaction system to a value in the range of from 5 to 9; and
    (3) allowing said at least one vinylic monomer to undergo polymerization or copolymerization and to bond to the surfaces of the particles of said graphite fluoride by graft polymerization; and
  b. compacting said powder material by applying a pressure thereto.

16. A method according to claim 15, wherein said powder material consists essentially of fine particles of said graphite fluoride coated with a vinylic polymer.

17. A method according to claim 15, wherein said powder material is a mixture of said fine particles of said graphite fluoride coated with a vinylic polymer and a synthetic resin in particulate form.

18. A method according to claim 17, wherein the amount of said synthetic resin is such that the total weight of said synthetic resin and said polymer in said powder material is not greater than the weight of said graphite fluoride in said powder material.

19. A method of producing a solid body which comprises a polymer-coated particulate graphite fluoride, the method comprising the steps of:
  a. preparing a powder material comprising fine particles of graphite fluoride coated with a vinylic polymer, the polymer coating being made by a coating method, comprising the steps of:
    (1) preparing a reaction system by dispersing from 1 to 100 parts by weight of graphite fluoride in the form of fine particles and from 0.1 to 100 parts by weight of at least one vinylic monomer capable of undergoing radical polymerization or radical copolymerization in a liquid medium comprised of 100 parts by weight of water and from 1 to 50 parts by weight of a surface-active agent, followed by adding to said liquid medium from 0.01 to 20% by weight, based on the weight of said at least one vinylic monomer, of a polymerization initiator for said at least one vinylic monomer;
  b. adjusting the pH of said reaction system to a value in the range of from 5 to 9; and
  c. allowing said at least one vinylic monomer to undergo polymerization or copolymerization and to bond to the surfaces of the particles of said graphite fluoride by graft polymerization.

20. A method according to claim 19, wherein said powder material consists essentially of fine particles of said graphite fluoride coated with a vinylic polymer.

21. A method according to claim 19, wherein said powder material is a mixture of said fine particles of said graphite fluoride coated with a vinylic polymer and a synthetic resin in particulate form.

22. A method according to claim 21, wherein the amount of said synthetic resin is such that the total weight of said synthetic resin and said polymer in said powder material is not greater than the weight of said graphite fluoride in said powder material.

* * * * *